US012759427B2

(12) United States Patent
Baig et al.

(10) Patent No.: US 12,759,427 B2
(45) Date of Patent: Oct. 13, 2026

(54) ELECTRIC VEHICLE CHARGING CONTROL DEVICE

(71) Applicant: NISSAN NORTH AMERICA, INC., Franklin, TN (US)

(72) Inventors: Najamuddin Mirza Baig, San Jose, CA (US); Liam Pedersen, San Francisco, CA (US); Xin Yang, Palo Alto, CA (US); Anna Baranskaya, Oakland, CA (US); Lance Atkins, Carmichael, CA (US); Kyle Wray, Fremont, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 258 days.

(21) Appl. No.: 18/309,763

(22) Filed: Apr. 28, 2023

(65) Prior Publication Data

US 2024/0359588 A1 Oct. 31, 2024

(51) Int. Cl.

*B60L 55/00* (2019.01)
*B60L 53/14* (2019.01)
*B60L 53/62* (2019.01)
*B60L 53/63* (2019.01)
*B60L 53/65* (2019.01)
*B60L 53/66* (2019.01)

(52) U.S. Cl.

CPC ............... *B60L 55/00* (2019.02); *B60L 53/14* (2019.02); *B60L 53/62* (2019.02); *B60L 53/63* (2019.02); *B60L 53/65* (2019.02); *B60L 53/66* (2019.02)

(58) Field of Classification Search

CPC .......... B60L 55/00; B60L 53/14; B60L 53/62; B60L 53/63; B60L 53/65; B60L 53/66

USPC ............................................................ 701/22

See application file for complete search history.

(56) References Cited

U.S. PATENT DOCUMENTS 9,037,507 B2 5/2015 Tate, Jr.
9,137,364 B2 9/2015 Gullapalli et al.
9,630,518 B2 4/2017 Gibeau
9,796,286 B2 10/2017 Atluri et al.
10,164,433 B2 12/2018 Miller et al.

(Continued)

FOREIGN PATENT DOCUMENTS

WO 2019/025075 A1 2/2019

*Primary Examiner* — Krishnan Ramesh
(74) *Attorney, Agent, or Firm* — Spencer Fane, LLP

(57) ABSTRACT

An electric vehicle charging control device includes an electronic dynamic charging schedule generator, a non-transitory computer readable medium and an electronic communicator. The charging schedule generator has an electronic controller configured to determine when an electric vehicle user accesses a charging port provided at a building structure powered by an electric source. The non-transitory computer readable medium stores vehicle profile data for the electric vehicle. The electronic communicator is configured to receive profile updates to the vehicle profile data from an electronic user interface. The electronic controller is programmed to generate a charging schedule based on the vehicle profile data. The charging schedule has a charge period in which the electric vehicle is receiving charge from the building structure and a discharge period in which the electric vehicle is providing charge to the building structure. The electronic controller controls the charging port in accordance with the charging schedule.

16 Claims, 12 Drawing Sheets

(56) References Cited

U.S. PATENT DOCUMENTS

| | | | | |
|---|---|---|---|---|
| 10,220,671 | B2 | 3/2019 | Gee et al. | |
| 10,262,536 | B2 | 4/2019 | Bezak et al. | |
| 10,630,081 | B2 | 4/2020 | Homma | |
| 10,857,900 | B2 | 12/2020 | Uyeki et al. | |
| 10,867,315 | B2 | 12/2020 | Uyeki | |
| 10,882,411 | B2 | 1/2021 | Yang et al. | |
| 10,913,367 | B2 | 2/2021 | Amari et al. | |
| 11,091,055 | B2 | 8/2021 | Tarchinski et al. | |
| 2011/0224852 | A1 | 9/2011 | Profitt-Brown et al. | |
| 2020/0082352 | A1 | 3/2020 | Liu et al. | |
| 2020/0231056 | A1 | 7/2020 | Sadano et al. | |
| 2020/0406778 | A1 | 12/2020 | Langton et al. | |
| 2021/0334915 | A1 | 10/2021 | Hishida et al. | |
| 2021/0339647 | A1 | 11/2021 | Batir et al. | |
| 2021/0380014 | A1 | 12/2021 | Hishida et al. | |
| 2021/0394642 | A1* | 12/2021 | Maeda | B60L 58/12 |
| 2022/0185135 | A1* | 6/2022 | Langton | B60L 58/12 |
| 2022/0188946 | A1* | 6/2022 | Moura | G06Q 30/0283 |
| 2022/0305942 | A1* | 9/2022 | Mannepalli | B60L 53/68 |
| 2023/0256855 | A1* | 8/2023 | Sartipizadeh | B60L 53/64 320/109 |
| 2023/0406143 | A1* | 12/2023 | Dow | G06Q 10/0631 |
| 2024/0022075 | A1* | 1/2024 | Ball | B60L 53/63 |
| 2024/0193630 | A1* | 6/2024 | Jones | B60L 53/63 |
| 2024/0343149 | A1* | 10/2024 | Galbraith | G06Q 50/06 |
| 2025/0033517 | A1* | 1/2025 | Hancock | B60L 53/66 |

* cited by examiner

ELECTRIC VEHICLE CHARGING CONTROL DEVICE

BACKGROUND

Technical Field

The present disclosure generally relates to an electric vehicle charging control device. More specifically, the present disclosure relates to an electric vehicle charging control device that can generate dynamic charging schedules.

Background Information

It has been known that when a large numbers of electric vehicles are being charged at a building structure, a lot of power is being drawn from the electric source at a particular time, especially if many electric vehicles arrive at around the same time period. In such a situation, a large number of electric vehicles concurrent with high electricity use in the building otherwise can overwhelm the electric source or the electric grid.

SUMMARY

In view of the state of the known technology, one aspect of the present disclosure is to provide an electric vehicle charging control device comprising an electronic dynamic charging schedule generator, a non-transitory computer readable medium and an electronic communicator. The electronic dynamic charging schedule generator has an electronic controller configured to determine when an electric vehicle user accesses a charging port provided at a building structure being powered by an electric source. The non-transitory computer readable medium stores vehicle profile data for the electric vehicle. The electronic communicator is configured to receive profile updates to the vehicle profile data from an electronic user interface. The electronic controller is programmed to generate a charging schedule for the electric vehicle based on the vehicle profile data. The charging schedule has a charge period in which the electric vehicle is receiving charge from the building structure and a discharge period in which the electric vehicle is providing charge to the building structure. The electronic controller controls the charging port in accordance with the charging schedule.

In view of the state of the known technology, another aspect of the present disclosure is to provide an electronic dynamic charging control method to be executed by a computer. The method comprises determining when an electric vehicle user accesses a charging port provided at a building structure being powered by an electric source. The method comprises accessing vehicle profile data for the electric vehicle from a non-transitory computer readable medium storing the vehicle profile data. The method comprises receiving profile updates to the vehicle profile data from a user interface. The method comprises generating a charging schedule for the electric vehicle based on the vehicle profile data. The charging schedule has a charge period in which the electric vehicle is receiving charge from the building structure and a discharge period in which the electric vehicle is providing charge to the building structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
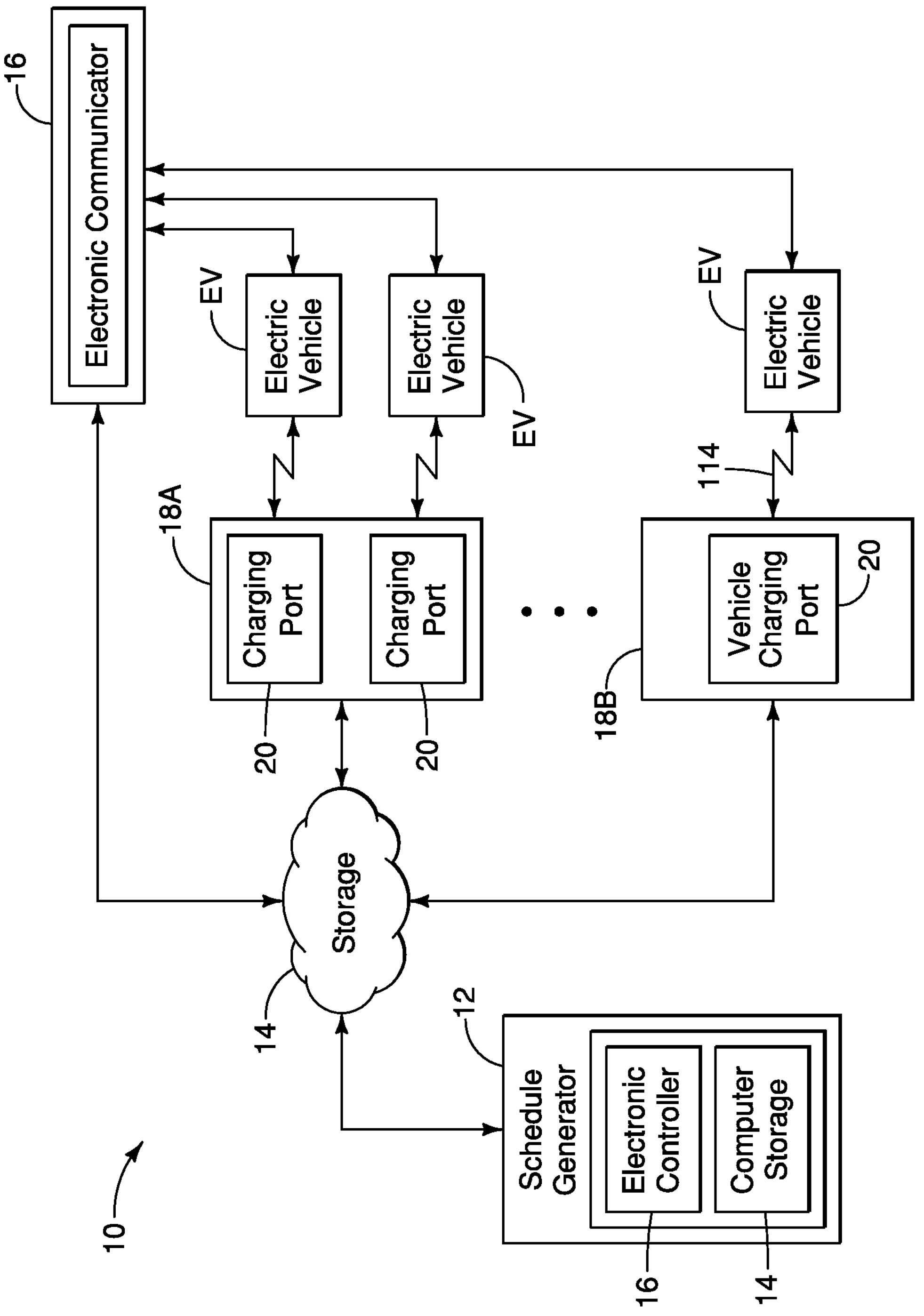
FIG. 1 is a schematic diagram of the electric vehicle charging control device in accordance with an illustrated embodiment.
Figure 2:
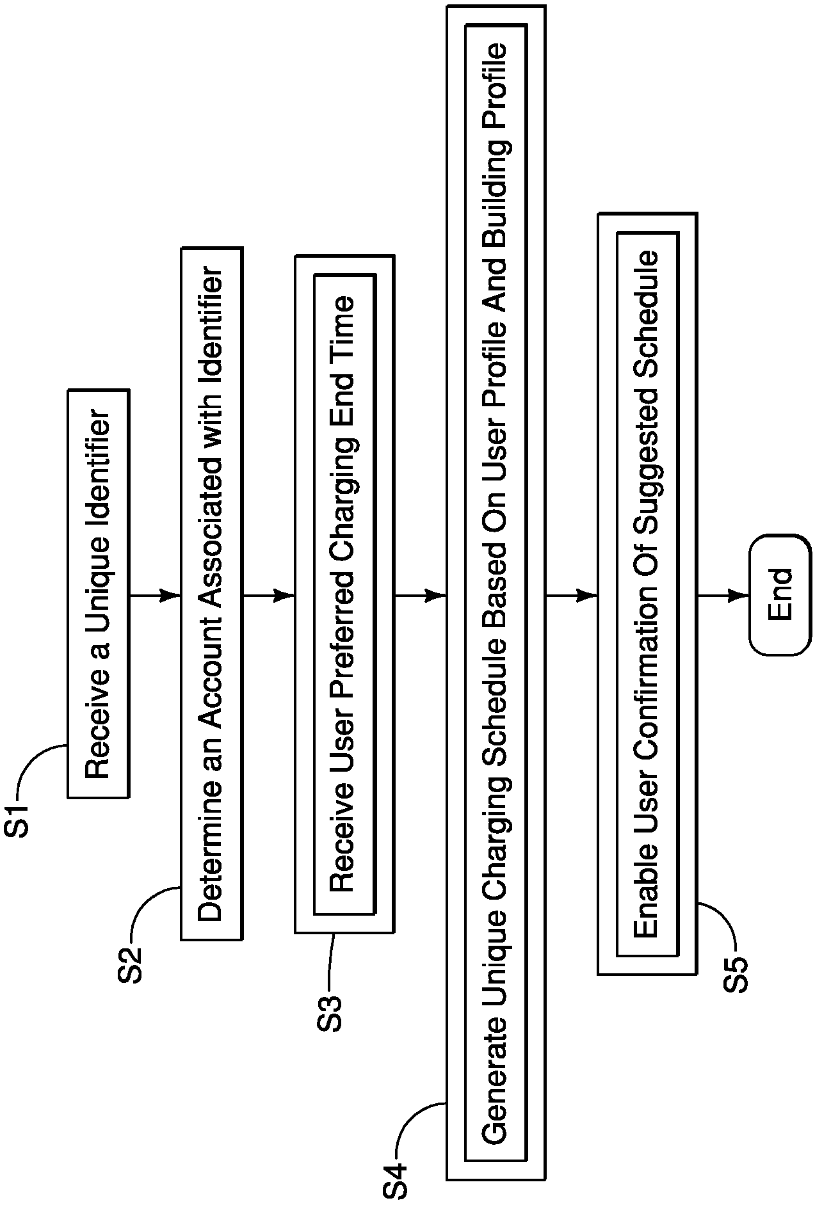
FIG. 2 is a flowchart illustrating a user authentication process of the electric vehicle charging control device.

Referring initially to FIG. 1, an electric vehicle charging control device 10 (hereinafter the "charging control device 10") is illustrated in accordance with an embodiment. The electric vehicle EV charging control device 10 comprises an electronic dynamic charging schedule generator 12 (hereinafter the "charging schedule generator 12"), a non-transitory computer readable medium 14 (hereinafter the "computer-readable medium 14") and an electronic communicator 16. As shown, the charging schedule generator 12 is to be implemented with a vehicle charging structure, such as a building structure 18 having one or more charging ports 20 for charging electric vehicles EV when the electric vehicles EV are plugged into the charging ports 20. The charging ports 20 are connected to an electric source that powers the building structure 18. The electric source can be a traditional electric source, such as an electric grid. Alternatively, the electric source can be forms of renewable energy such as solar panels that are installed to the building structure 18. The charging port 20 is provided at the building structure 18 that is powered by the electric source.

The charging control device 10 further comprises the building structure 18 having one or more charging ports 20.

Figure 3:
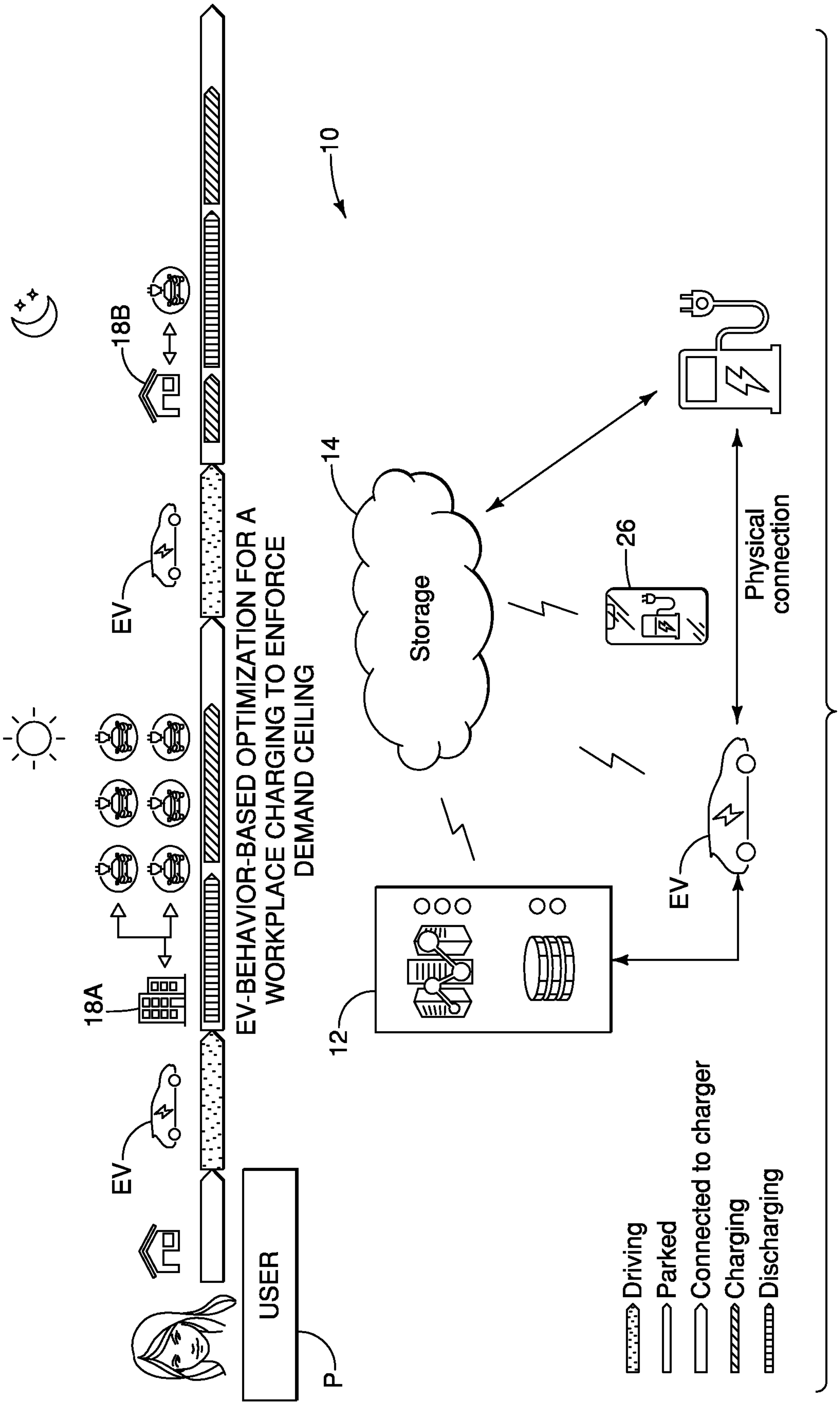
FIG. 3 is another schematic diagram of the electric vehicle charging control device.

As shown in FIGS. 1 and 3, the charging schedule generator 12 can be implemented with a plurality of building structures 18 that can include community use buildings 18A (e.g., office buildings or apartment buildings) or stand-alone homes 18B. Therefore, the charging control device 10 can comprise a plurality of building structures 18A and 18B, as seen in FIG. 1.

It has been known that when a large numbers of electric vehicles EV are being charged at a building structure 18, a lot of power is being drawn from the electric source at a particular time, especially if many electric vehicles EV arrive at around the same time period. In such a situation, a large number of electric vehicles EV concurrent with high electricity use in the building otherwise can overwhelm the electric source or the electric grid.

Therefore, the charging control device 10 is provided with the charging schedule generator 12 that can generate unique charging schedules 22 for each electric vehicle EV depending on the profile of the electric vehicle EV and the building structure profile. The charging schedules 22 are configured to be dynamic, that is, the charging schedules 22 can change depending on changing circumstances to the building structure 18. In other words, the charging schedule generator 12 is configured to update the charging schedules 22 based on changing circumstances to the building structure 18.

In the instance of a building structure 18 that includes multiple charging ports 20, the charging schedule generator 12 preferably generates charging schedules 22 to prevent the electric vehicles EV from overwhelming the electric load of the building structure 18. The charging schedule generator 12 also preferably generates charging schedules 22 to avoid peak electricity price hours. In the instance of a building structure 18 that includes a single charging port 20, such as a home, the charging schedule generator 12 preferably generates charging schedules 22 to avoid charging the electric vehicle EV during peak electricity price hours.

For simplicity, this disclosure will focus on the application of the vehicle charging control device 10 for a single electric vehicle EV. However, it will be apparent to those skilled in the vehicle field from this disclosure that the vehicle charging control device 10 can be implemented for a variety of electric vehicles EV receiving charge at various types of building structures 18. For simplicity, the vehicle charging control device 10 will generally be described with reference to application with a building structure 18A that includes multiple charging ports 20, such as at an office building.

As seen in FIG. 1, the electronic dynamic charging schedule generator 12 includes an electronic controller 24 that is programmed to generate the charging schedule 22 for the electric vehicle EV based on the vehicle profile data D of the electric vehicle EV, and the building structure 18, as will be further described below.

Figure 11:
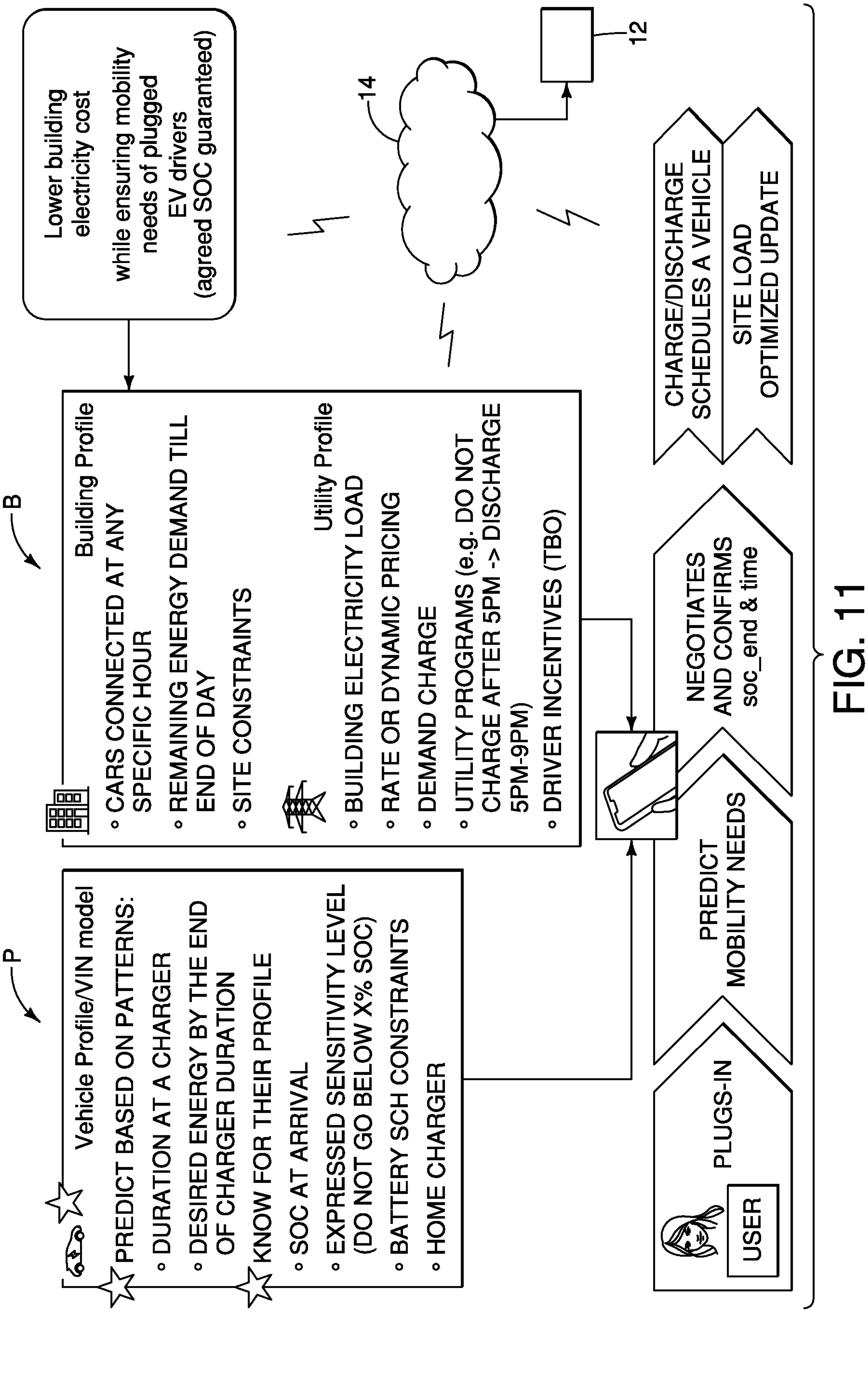
FIG. 11 is a schematic diagram of sample building profile data and vehicle profile data.
Figure 12:
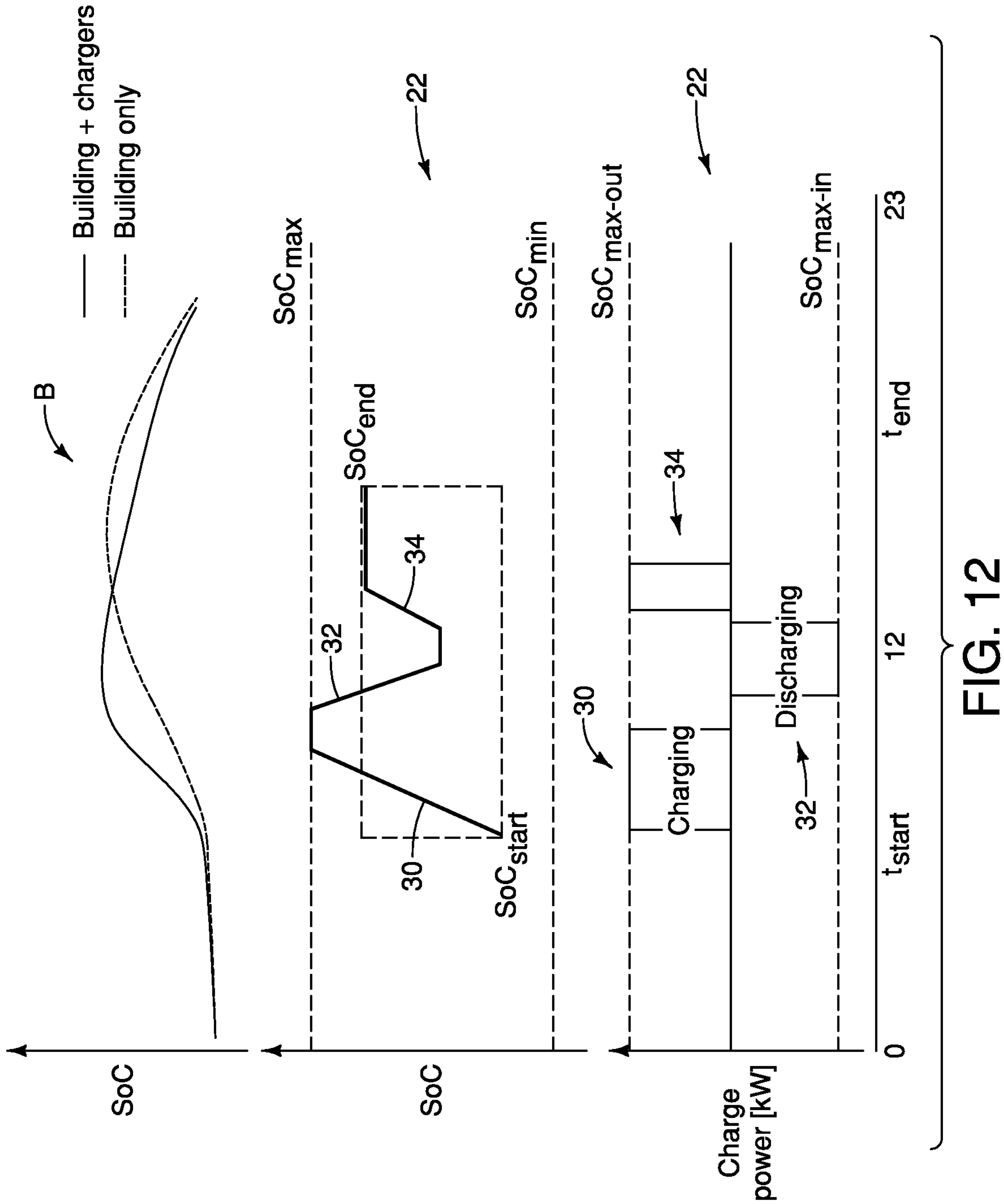
FIG. 12 is a schematic diagram of sample charging schedules generated by the electric vehicle charging control device having charge, discharge and recharge periods.

The electronic controller 24 is configured to determine when an electric vehicle user P accesses the charging port 20. Therefore, the charging control device 10 is equipped with the electric communicator 16. The electric communicator 16 can be a wired connection that is established between the electric vehicle EV and the charging port 20 when the electric vehicle EV is plugged into the charging port 20. Therefore, the electric communicator 16 can include a power-line communication (PLC) that utilizes modulated carrier signals to transmit information between the electric vehicle EV and the electronic controller 24. In the illustrated embodiment, the electronic communicator 16 is also preferably configured to receive profile updates to the vehicle profile data D from an electronic user interface 26, such as shown in FIG. 11. As seen in FIG. 3, the electric vehicle user P can transmit information to the electronic controller 24 wirelessly by accessing a charging app on a mobile device, as will be further described below. The user interface 26 can be a display screen that is provided on a mobile device and can display operations of the charging app that is compatible with the charging control device 10.

Therefore, the electric communicator 16 can also be a wireless communicator that includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth communications or any other type of signal suitable for wireless communications as understood in the vehicle field. Here, the electric communicator 16 can be a one-way wireless communication unit such as a transmitter.

The electronic controller 24 is a computer that includes one or more processors 28 to execute the functions of the dynamic charging schedule generator 12. As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

The processor 28 can execute instructions transmitted by one or more transmission media, including coaxial cables, copper wire and fiber optics, including the wires that comprise a system bus coupled to a processor 28 of a computer. As used herein, the terminology "instructions" may include directions or expressions for performing any method, or any portion or portions thereof, disclosed herein, and may be realized in hardware, software, or any combination thereof.

For example, instructions may be implemented as information, such as a computer program, stored in memory that may be executed by the processor 28 to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

Computer-executable instructions can be compiled or interpreted from computer programs created using a variety of programming languages and/or technologies, including, without limitation, and either alone or in combination, Java™, C, C++, Visual Basic, Java Script, Perl, etc. In general, the processor 28 receives instructions from the computer-readable medium 14 and executes these instructions, thereby performing one or more processes, including one or more of the processes described herein. Such instructions and other data may be stored and transmitted using a variety of computer-readable media.

Referring to FIGS. 1 to 4, the electronic controller 24 determines the charging schedule 22 as follows. When the electric vehicle user P plugs into the charging port 20, the user will be prompted to authenticate a user profile. Authentication can occur by scanning a personalized QR code on the electric vehicle EV or swiping a personalized charge card. Alternatively, the user can type a charging number onto the mobile phone application. In this way, the electronic controller 24 can access the vehicle profile data D via wireless communication using the mobile app.

Preferably, the vehicle profile data D includes the VIN number of the electric vehicle EV, a charger identification number of the electric vehicle EV, user identification of the vehicle user P, a plug-in start time of the electric vehicle EV per use, and a state-of-charge of the vehicle's battery during plug-in. Therefore, by accessing the app and registering the authenticating the user profile, the electronic controller 24 can register that the electric vehicle EV (e.g., the vehicle's VIN number, or a user authentication ID) is plugged into the charging port 20, including the start time that the electric vehicle EV is plugged in. Preferably, the vehicle profile data D also includes a driving calendar of previous driving and charging events, past user defined preferences for charging times and charging periods, and the overall state-of-charge of the battery during its battery life.

Therefore, the vehicle profile data D includes historic vehicle driving behavior and historic vehicle charging patterns, such as the examples listed in FIG. 11. The vehicle profile data D further includes the state-of-charge of the battery of the electric vehicle EV. That is, the electronic controller 24 can prevent trying to fully charge the electric vehicle EV of the battery is not healthy.

Figure 4:
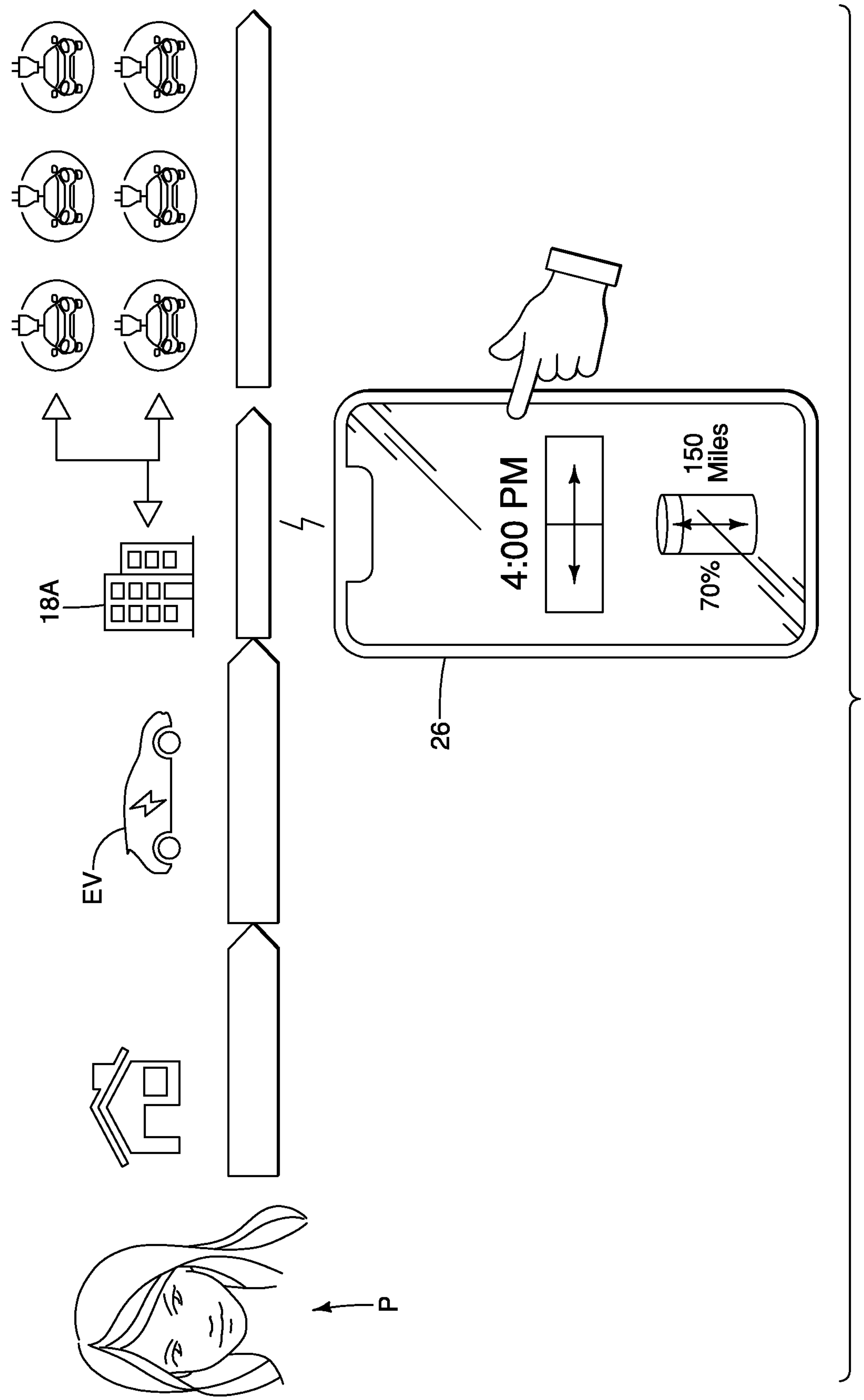
FIG. 4 is a sample user interface that is implemented with the electric vehicle charging control device to communicate user profile data.

The electronic controller 24 is configured to generate the charging schedule 22 based on the user profile and transmit the suggested charging schedule 22 to the user via the user app. For example, as seen in FIG. 4, the charging schedule 22 can estimate that the user will be plugged in until 4 pm (i.e., charging end time) with end charge of 90% (i.e., end state-of-charge) based on previous user charging events (e.g., past charging needs) and the current state-of-charge of the battery. The vehicle user P can optionally confirm or deny the suggested charging schedule 22 by confirming or denying the suggested charge end time and the end charge on the user interface 26. Preferably, the electronic controller 24 allows the user to adjust charging end time by inputting the preferred charging end time into the user interface 26. Therefore, the vehicle profile data D further includes the user's preferred end charge time that is inputted by the electronic user interface 26. The electronic controller 24 controls the charging port 20 in accordance with the charging schedule 22. That is, the electronic controller 24 can send a signal vial the PLC to the charging port 20 to stop charging at the end time.

The electronic controller 24 then generates a finalized charging schedule 22 based on the user input data. The electronic controller 24 is configured to use the finalized charging schedule 22 to help determine a charge period 30 and a discharge period 32 of the charging schedule 22 as will be discussed below. The electronic controller 24 is configured to control the charging port 20 to charge the electric vehicle EV in accordance with the charging schedule 22 and to stop charging the vehicle at the end time of the charging schedule 22.

The computer readable medium 14 of the charging control device 10 stores the vehicle profile data D for the electric vehicle EV. Therefore, the computer readable medium 14 is a data storage device. As used herein, the terminology "data storage" or "computer-readable medium 14" (also referred to as a processor 28-readable medium 14) indicates any computer-usable or computer-readable medium 14 or device that can tangibly contain, store, communicate, or transport any signal or information that may be used by or in connection with any processor 28. For example, the computer-readable medium 14 may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

Therefore, the computer-readable medium 14 further includes any non-transitory (e.g., tangible) medium that participates in providing data (e.g., instructions) that may be read by a computer (e.g., by the processor 28). Such a medium may take many forms, including, but not limited to, non-volatile media and volatile media. Non-volatile media can include, for example, optical or magnetic disks and other persistent memory. Volatile media may include, for example, dynamic random access memory (DRAM), which typically constitutes a main memory.

The computer-readable medium 14 can also be provided in the form of one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The computer readable medium 14 can be disposed on or part of a remote server or any type of network configured to provide for voice, data, or any other type of electronic communication. For example, the computer readable medium 14 can be disposed on a local area network (LAN), a wide area network (WAN), a virtual private network (VPN), a mobile or cellular telephone network, the Internet, a cloud server or a remote database. Therefore, as seen in FIGS. 1 and 3, the computer readable medium 14 can be disposed on both one or both of a cloud server or an external server that has the electronic controller 24 for the charging schedule generator 12.

Figure 6:
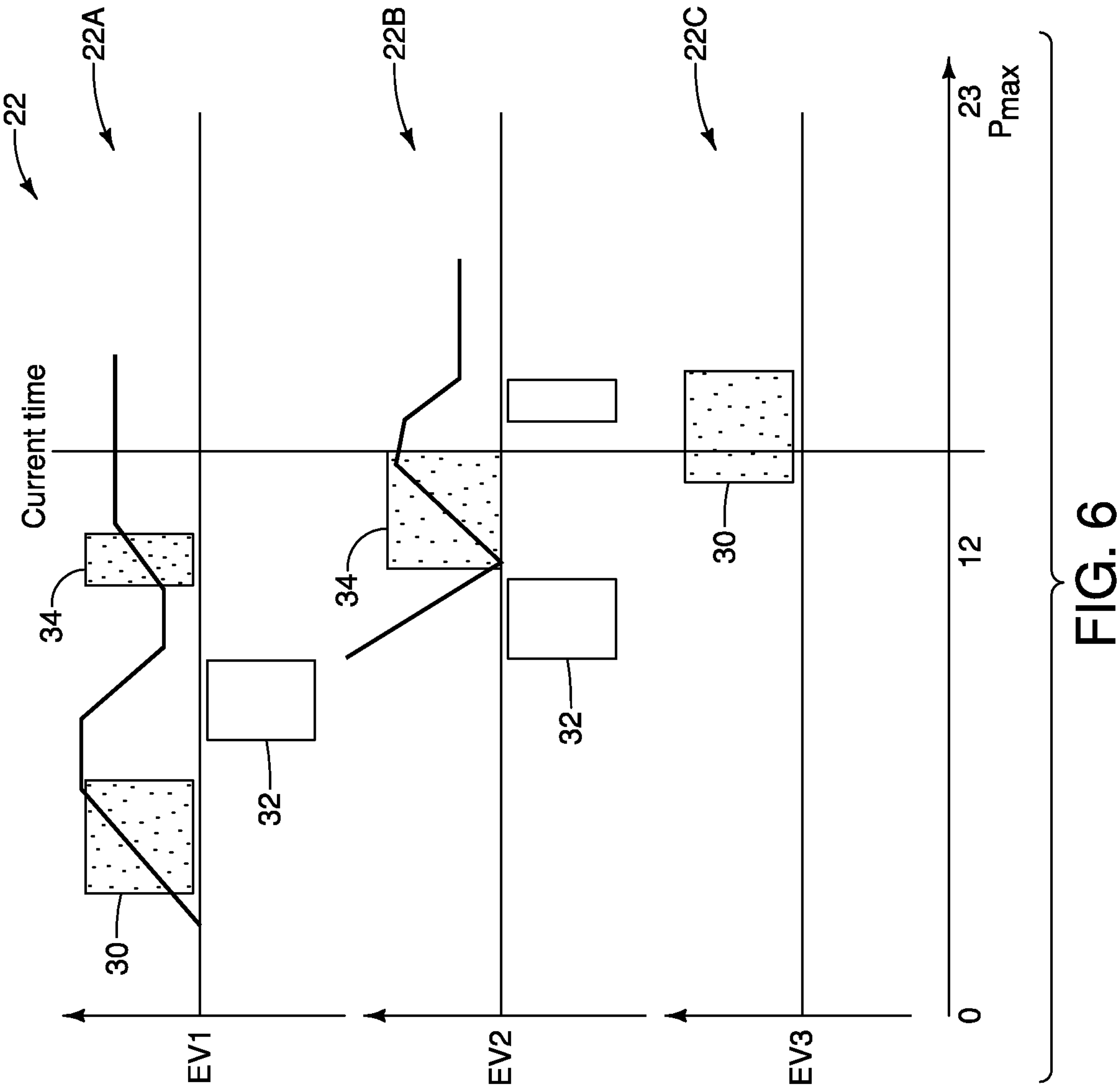
FIG. 6 is a schematic diagram of sample charging schedules generated by the electric vehicle charging control device in accordance with the building structure profile data.
Figure 7:
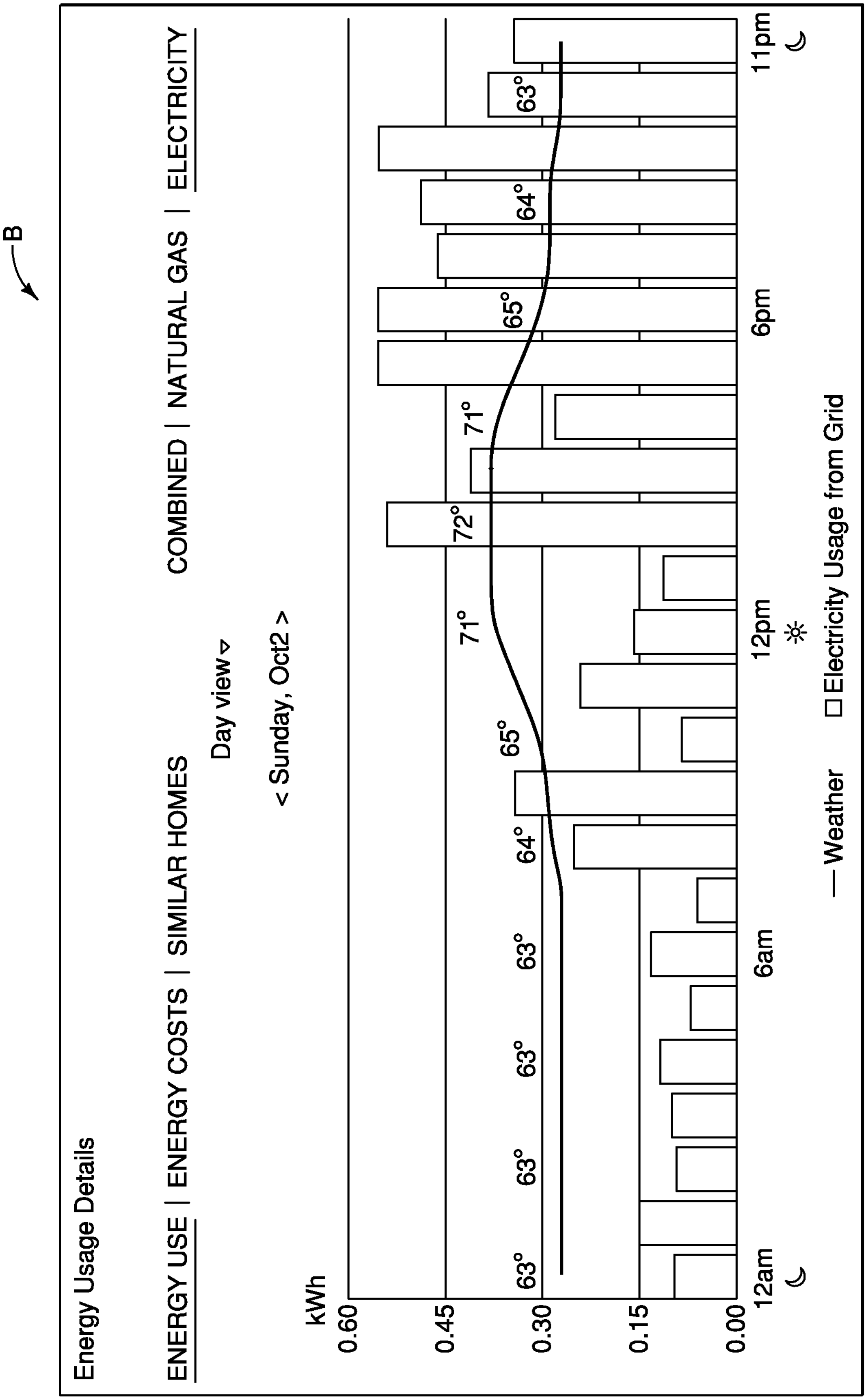
FIG. 7 is chart illustrating sample building structure profile data that is used by the electric vehicle charging control device.
Figure 8:
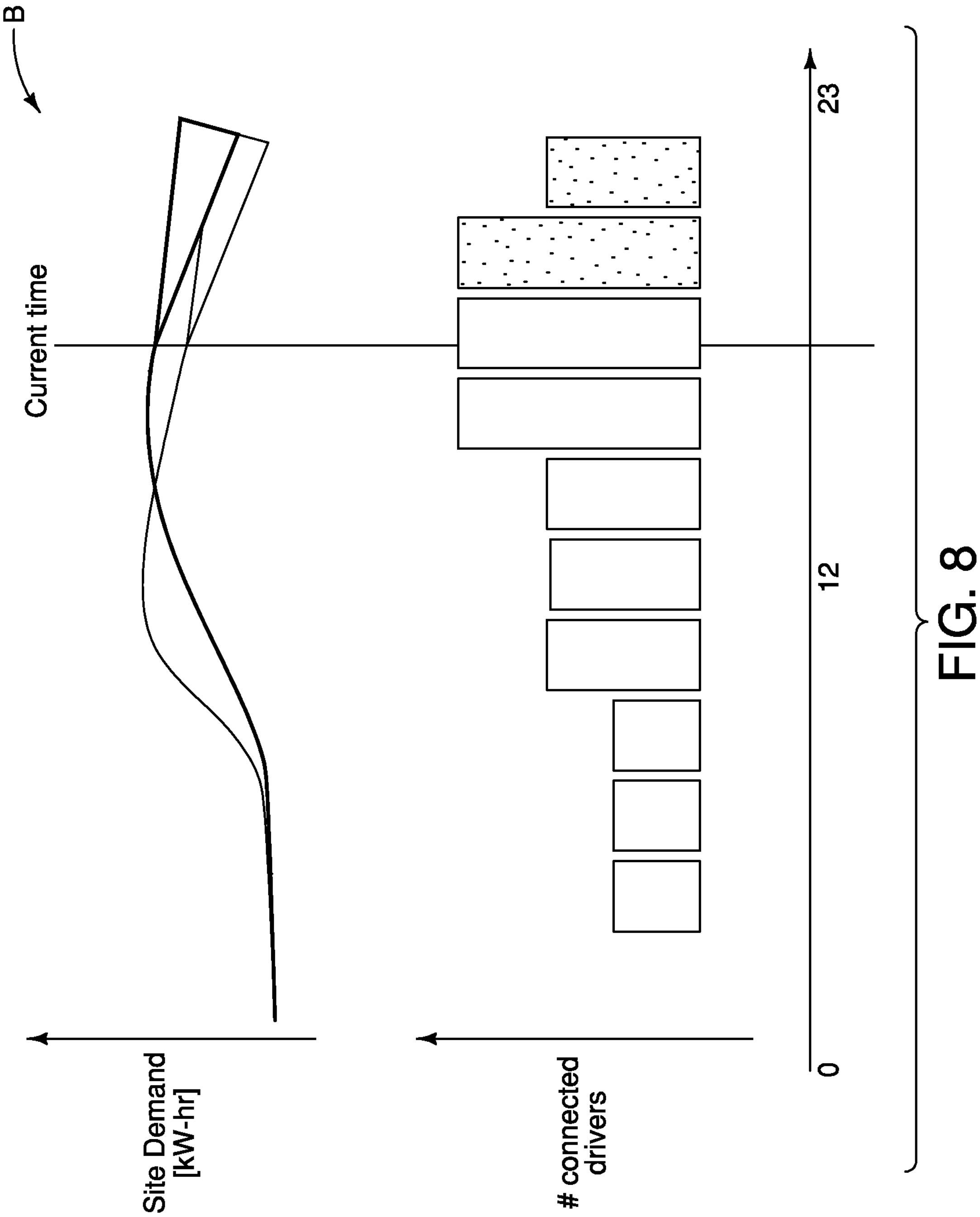
FIG. 8 is a chart illustrating additional sample building structure profile data that is used by the electric vehicle charging control device.
Figure 9A:
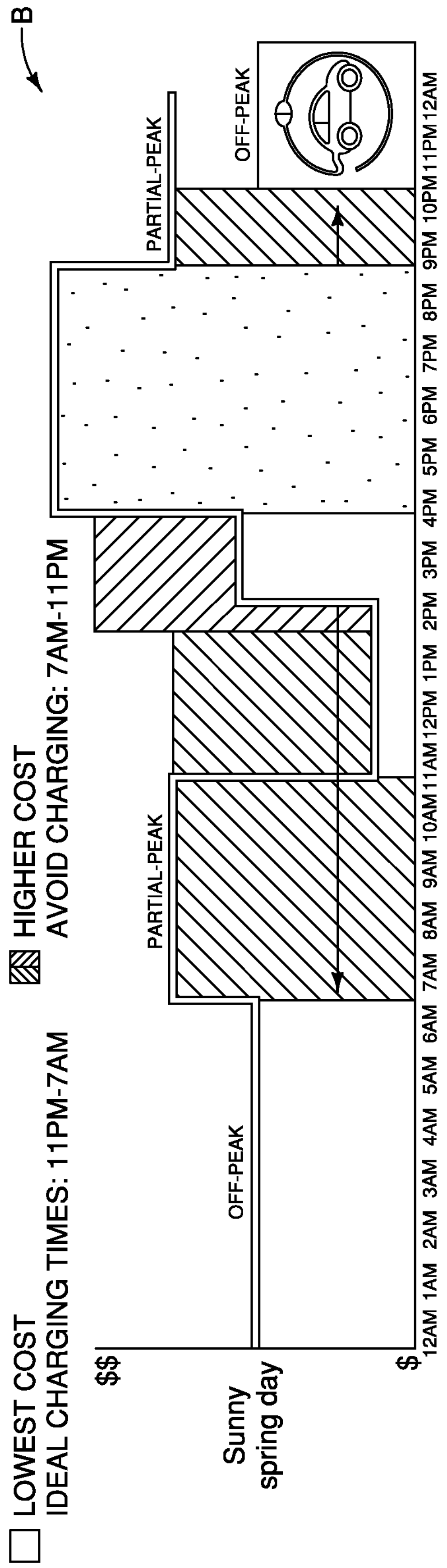
FIG. 9A is a chart illustrating additional sample building structure profile data that is used by the electric vehicle charging control device.
Figure 9B:
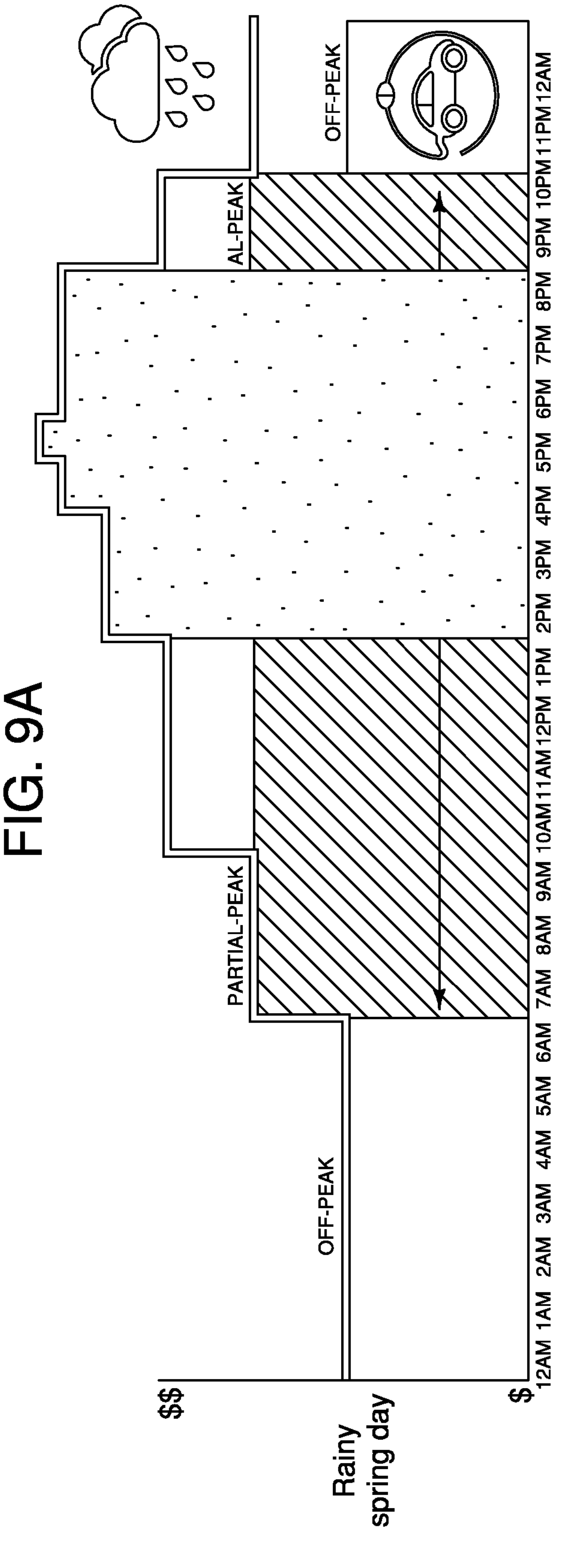
FIG. 9B is another chart illustrating additional sample building structure profile data that is used by the electric vehicle charging control device.

In the illustrated embodiment, the computer readable medium 14 further stores building structure profile data B for the building structure 18. The building structure profile data B includes building structure 18 electric load and utility use data. Utility use data can include price rates, dynamic demand for electricity at the building, vehicle-gride integration (VGI) programs, or dynamic pricing. FIGS. 6 to 9 illustrates different samples of building structure profile data B. For example, FIG. 6 illustrates an average use of electricity for the building structure 18 throughout a given day. FIG. 7 illustrates historical electricity demand for the building structure 18 in a given day. FIG. 8 illustrates changing electricity prices for the building structure 18 throughout a given day. FIG. 9 illustrates projected average electricity needs for the building structure 18 throughout a given day.

For each building structure 18, the electronic controller 24 is preferably programmed to calculate how many electric vehicles EV are receiving charge or are plugged in at any specific time of day (tod). Therefore, the electronic controller 24 can calculate the number of electric vehicles EV that will likely be charging or plugged in within a period, such as within one hour: ($n_{cars}$~p($n_{cars}$|tod).

The electronic controller 24 is programmed to calculate a charging period or duration of a vehicle $T_{car}$: $T_{car}$~p($T_{car}$-

|tod, weekday, [VIN]). The electronic controller 24 is programmed to calculate a remaining energy demand for the rest of the day for the building structure 18. For example, the electronic controller 24 can calculate a vehicle energy demand per day [KW-hr/day]: $E_{car,day} \sim p(E_{car,day}|\text{weekday})$. The electronic controller 24 can calculate the building structure 18's total energy demand per hour [KW-hr/hr]: $E_{site,hour} \sim p(E_{site,hour}|\text{tod, weekday})$.

Figure 5:
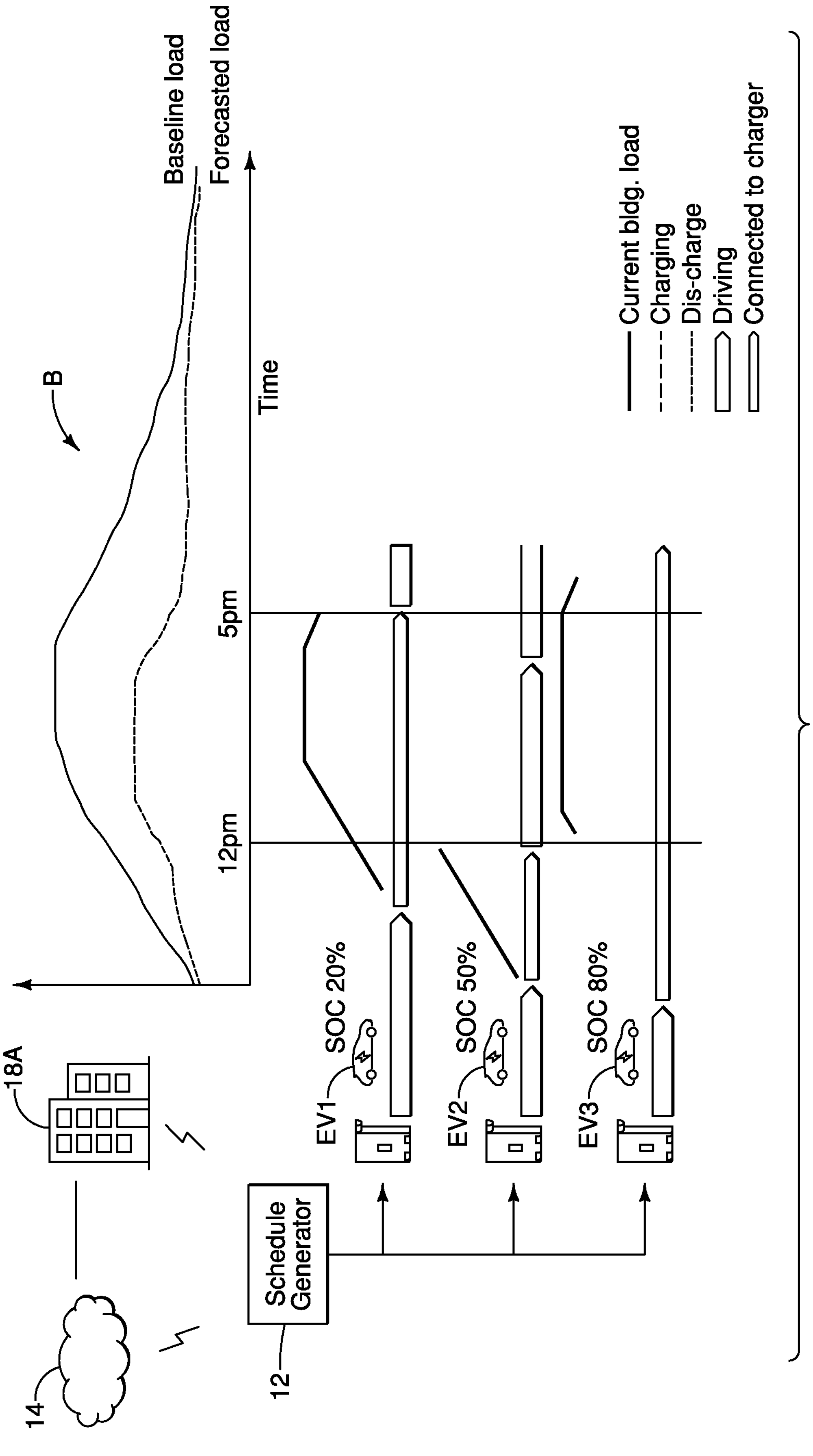
FIG. 5 is a schematic diagram of a charging scenario of a building structure having the electric vehicle charging control device.

For example, FIG. 4 illustrates a situation in which electric vehicles EV EV1, EV2 and EV3 having different existing states-of-charge arriving at the building structure 18 at different times. The vehicle EV1 plugs in during the morning and will still until the afternoon (5 pm). The vehicle EV2 arrives earlier in the morning than the vehicle EV1 but will stay plugged in only until 12 pm. The vehicle EV3 arrives in the afternoon and will still until after 5 pm. All of these plug-in times and projected end charge times become part of the building structure profile, which are automatically uploaded via the electronic communicator 16 when the vehicles EV1, EV2 and EV3 plug into their respective charging ports 20. The electronic controller 24 will generate charging schedules 22 for each of the vehicles EV1, EV2 and EV3 to charge the vehicles EV1, EV2 and EV3 in accordance with their user's requests, and also to help shift the electric load of the building towards a low-cost period. FIG. 5 illustrates sample charging schedules 22 for different vehicles arriving at different times and staying for different durations.

In this way, the charging schedule generator 12 can account for dynamic changes in the electric vehicles EV plugged in to the building structure 18 throughout a day. Also, the charging schedule generator 12 can account for changing user charging patterns throughout a single day and throughout a longer period of use. Thus, the electronic controller 24 is further programmed to generate the charging schedule 22 based on the building structure profile data B.

In the illustrated embodiment, as best seen in FIG. 11, the charging schedule 22 generated by the charging schedule generator 12 has a charge period 30 in which the electric vehicle EV is receiving charge from the building structure 18. The charging schedule 22 has a discharge period 32 in which the electric vehicle EV is providing charge to the building structure 18. In the discharge period 32, the electronic controller 24 controls the charging port 20 such that the existing charge of the electric vehicle EV is used to charge the other vehicles EV that are plugged into the other charging ports 20 of the building structure 18.

As shown in FIGS. 5 and 9, the typical building structure's 18 electric load is heavier during an afternoon period of a day because more electric vehicles EV are likely plugged in during the afternoon versus during the morning. Therefore, the electronic controller 24 preferably determines that the discharge period 32 for the electric vehicle EV will occur during the afternoon where a lot of other electric vehicles EV are also plugged into the building structure 18. In this instance, the electronic controller 24 determines that the electric vehicle EV will be plugged into the charging port 20 for a duration of period that will surpass the heavy load period such that the electric vehicle EV has enough charging time to receive recharge. In this way, the charging schedule generator 12 can shift the total load of the building charging from a high cost period (afternoon) to a low cost period (morning).

In other words, the electronic controller 24 is programmed to determine that the charge period 30 substantially corresponds to a period in which the building structure 18 is in a low electric use period based on the building structure profile data B. The electronic controller 24 is programmed to determine that the discharge period 32 corresponds to a period in which the building structure 18 is in a high electric use period based on the building structure profile data B. The electronic controller 24 is further programmed to determine a recharge period 34 in which the electric vehicle EV further receives charge from the building structure 18.

Figure 10:
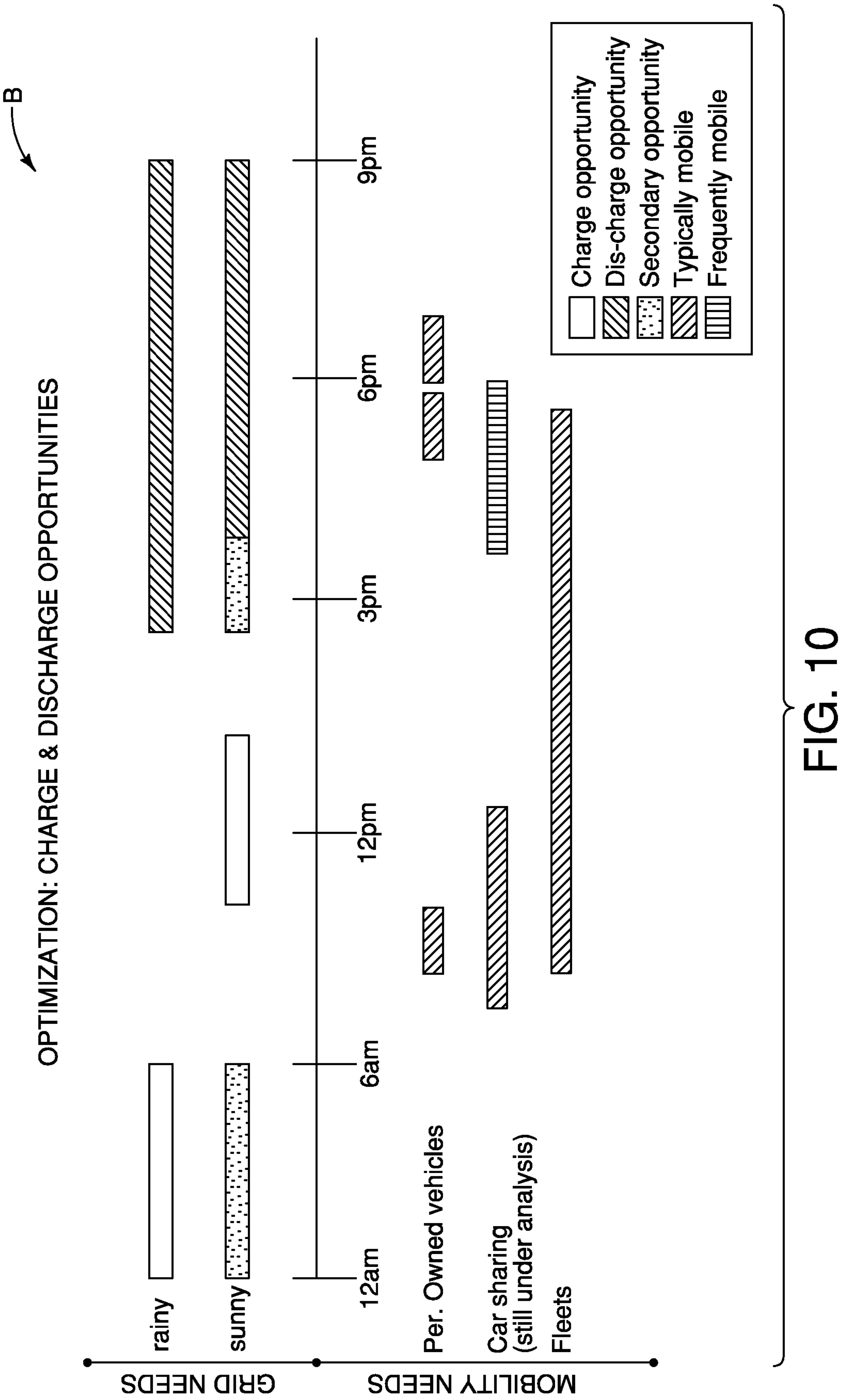
FIG. 10 is a chart illustrating additional sample building structure profile data that is used by the electric vehicle charging control device.

That is, the electronic controller 24 is programmed to generate the charging schedule 22 having the charge period 30 as a first period, followed by the discharge period 32 as a second period and followed the recharge period 34 as a third period. The first, second and third periods can occur in succession or can occur in any particular order, such as the discharge period can occur before the charge period. If the electronic controller 24 determines that the electric vehicle EV is not going to be plugged in long enough to receive recharge based on the user's desired end charge, then the electronic controller 24 will not generate the charging schedule 22 to have a discharge period 32. In this way, the electronic controller 24 can generate the charging schedule 22 that has an agreed upon end charge time and an end charge amount with the user. FIG. 10 illustrates a series of sample charging schedules 22 having charging, discharging and recharging periods 30, 32 and 34.

In the illustrated embodiment, an electronic dynamic charging control method to be executed by a computer is provided. The method comprises determining when an electric vehicle user P accesses a charging port 20 provided at a building structure 18 being powered by an electric source. The method further comprises accessing vehicle profile data D for the electric vehicle EV from a non-transitory computer readable medium 14 storing the vehicle profile data D. The method further comprises receiving profile updates to the vehicle profile data D from a user interface 26. The method further comprises generating a charging schedule 22 for the electric vehicle EV based on the vehicle profile data D.

The method further comprises accessing building structure profile data B for the building structure 18 that includes building structure electric load and utility use data. The method further comprises generating the charging schedule 22 based on the building structure profile data B. The method further comprises determining that the charge period 30 substantially corresponds to a period in which the building structure 18 is in a low electric use period. The method further comprises determining that the discharge period 32 substantially corresponds to a period in which the building structure 18 is in a high electric use period. The method further comprises determining the recharge period 34 for the charging schedule 22 in which the vehicle further receives charge from the building structure 18. The method further comprises determining that the charge period 30 is a first period, the discharge period 32 as a second period and the recharge period 34 as a third period, the first, second and third periods occurring in succession. The method further comprises controlling the charging port 20 in accordance with the charging schedule 22.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle charging system equipped with the electric vehicle charging control device. Accordingly, these terms, as utilized to describe the present invention should be interpreted relative to a vehicle charging system equipped with the electric vehicle charging control device.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electric vehicle charging control device comprising:

an electronic dynamic charging schedule generator having an electronic controller configured to determine when an electric vehicle user accesses a charging port provided at a building structure being powered by an electric source;

a non-transitory computer readable medium storing vehicle profile data for the electric vehicle and building structure profile data for the building structure, the building structure profile data including dynamic data regarding at least one of electric load and utility use for the building structure;

an electronic communicator configured to receive profile updates to the vehicle profile data as updated vehicle profile data from an electronic user interface, the electronic communicator being selected from the group consisting of: a wired connection that transmits information between the electric vehicle and the electronic controller and a wireless communication unit in communication with the electric vehicle and the electronic controller, the electronic controller being programmed to generate a charging schedule for the electric vehicle based on the vehicle profile data and the building structure profile data, the charging schedule having a charge period in which the electric vehicle is receiving charge from the building structure and a discharge period in which the electric vehicle is providing charge to the building structure, the electronic controller controlling the charging port in accordance with the charging schedule, the vehicle profile data including at least one selected from the group consisting of: historic driving behavior and historic charging patterns for the electric vehicle, and a state-of-charge of a battery of the electric vehicle, and the electronic controller being programmed to dynamically update the charging schedule for the electric vehicle in response to a change in at least one of: the updated vehicle profile data from the electronic user interface and the dynamic data, the updated vehicle profile data including at least one of: an updated end charge time and an updated end state-of-charge for the electric vehicle.

2. The electric vehicle charging control device according to claim 1, wherein the electronic controller is further programmed to generate the charging schedule based on the building structure profile data.

3. The electric vehicle charging control device according to claim 2, wherein the electronic controller is programmed to determine that the charge period substantially corresponds to a period in which the building structure is in a low electric use period based on the building structure profile data.

4. The electric vehicle charging control device according to claim 3, wherein the electronic controller is programmed to determine that the discharge period correspond to a period in which the building structure is in a high electric use period based on the building structure profile data.

5. The electric vehicle charging control device according to claim 4, wherein the electronic controller is further programmed to determine a recharge period in which the electric vehicle further receives charge from the building structure.

6. The electric vehicle charging control device according to claim 5, wherein the electronic controller is programmed to generate the charging schedule having the charge period as a first period, followed by the discharge period as a second period and followed by the recharge period as a third period, the first, second and third periods occurring in succession.

7. The electric vehicle charging control device according to claim 1, wherein the vehicle profile data includes the historic driving behavior of the electric vehicle and the historic charging patterns of the electric vehicle.

8. The electric vehicle charging control device according to claim 1, wherein the vehicle profile data includes the state-of-charge of the battery of the electric vehicle.

9. A charging station having the electric vehicle charging control device of claim 1, comprising the charging port.

10. An electronic dynamic charging control method to be executed by a computer, the method comprising:

determining when an electric vehicle user accesses a charging port provided at a building structure being powered by an electric source;

accessing vehicle profile data for the electric vehicle and building structure profile data for the building structure from a non-transitory computer readable medium storing the vehicle profile data and the building structure profile data, the building structure profile data including dynamic data regarding at least one of electric load and utility use for the building structure;

receiving profile updates to the vehicle profile data as updated vehicle profile data from a user interface;

generating a charging schedule for the electric vehicle based on the vehicle profile data and the building structure profile data, the charging schedule having a charge period in which the electric vehicle is receiving charge from the building structure and a discharge period in which the electric vehicle is providing charge to the building structure;

dynamically updating the charging schedule for the electric vehicle in response to a change in at least one of: the updated vehicle profile data from the electronic user interface and the dynamic data, the updated vehicle profile data including at least one of: an updated end charge time and an updated end state-of-charge for the electric vehicle; and controlling the charging port in accordance with the charging schedule, the vehicle profile data including at least one selected from the group consisting of: historic driving behavior and historic charging patterns for the electric vehicle, and a state-of-charge of a battery of the electric vehicle.

11. The electronic dynamic charging control method according to claim 10, further comprising generating the charging schedule based on the building structure profile data.

12. The electronic dynamic charging control method according to claim 10, wherein the vehicle profile data includes the historic driving behavior of the electric vehicle and the historic charging patterns of the electric vehicle.

13. The electronic dynamic charging control method according to claim 10, further comprising determining that the charge period substantially corresponds to a period in which the building structure is in a low electric use period.

14. The electronic dynamic charging control method according to claim 13, further comprising determining that the discharge period substantially corresponds to a period in which the building structure is in a high electric use period.

15. The electronic dynamic charging control method according to claim 10, further comprising determining a recharge period for the charging schedule in which the vehicle further receives charge from the building structure.

16. The electronic dynamic charging control method according to claim 10, further comprising determining that the charge period is a first period, the discharge period as a second period and the recharge period as a third period, the first, second and third periods occurring in succession.

* * * * *